(12) United States Patent  (10) Patent No.: US 9,386,001 B1
Marquardt et al.  (45) Date of Patent: Jul. 5, 2016

(54) BORDER GATEWAY PROTOCOL (BGP) COMMUNICATIONS OVER TRUSTED NETWORK FUNCTION VIRTUALIZATION (NFV) HARDWARE

(71) Applicant: Sprint Communications Company L.P., Overland Park, KS (US)

(72) Inventors: Ronald R. Marquardt, Woodinville, WA (US); Lyle Walter Paczkowski, Mission Hills, KS (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/635,631

(22) Filed: Mar. 2, 2015

(51) Int. Cl.
  *H04L 12/66* (2006.01)
  *H04L 29/06* (2006.01)
  *H04L 12/771* (2013.01)

(52) U.S. Cl.
  CPC ...................................... *H04L 63/06* (2013.01)

(58) Field of Classification Search
  CPC .................... G06F 9/45533; H04L 12/4641
  See application file for complete search history.

(56) References Cited

U.S. PATENT DOCUMENTS

| 7,930,424 | B1 | 4/2011 | Nucci et al. |
| 8,929,364 | B2 | 1/2015 | Anumala et al. |
| 2005/0198269 | A1 | 9/2005 | Champagne et al. |
| 2014/0003227 | A1 | 1/2014 | Scudder et al. |
| 2014/0181267 | A1 | 6/2014 | Wadkins et al. |
| 2014/0201374 | A1 | 7/2014 | Ashwood-Smith et al. |
| 2014/0229945 | A1 | 8/2014 | Barkai et al. |
| 2014/0241247 | A1 | 8/2014 | Kempf et al. |

FOREIGN PATENT DOCUMENTS

| WO | 2014110453 | 7/2014 |
| WO | 2014125486 | 8/2014 |

OTHER PUBLICATIONS

WO2015169126A1-English Translation. Nov. 12, 2015.*
Protecting the confidentiality of virtual machines aginast untrusted host. Kong, Jinzhu. ISIIPTC(2010).*
New approaches to security and availability for cloud data. Juels et al. Communications of the ACM(Feb. 2013).*

* cited by examiner

*Primary Examiner* — Venkat Perungavoor

(57) ABSTRACT

A first Network Function Virtualization (NFV) computer system generates Hardware Root-of-Trust (HRoT) challenge data and transfers the HRoT challenge data in first Border Gateway Protocol (BGP) signaling to a second NFV computer system. The second NFV computer system identifies a physically-embedded HRoT code and generates an HRoT result based on the challenge data and code. The second NFV computer system transfers second BGP signaling having the HRoT result to the first NFV computer system. The first NFV computer system compares the HRoT result from the second BGP signaling to target HRoT data. The first NFV computer system executes a BGP process based on the second BGP signaling if the HRoT result corresponds to the target HRoT data. In some examples, the NFV computer systems also exchange the BGP signaling to verify NFV time slices for BGP Virtual Machines (VMs).

20 Claims, 8 Drawing Sheets

BORDER GATEWAY PROTOCOL (BGP) COMMUNICATIONS OVER TRUSTED NETWORK FUNCTION VIRTUALIZATION (NFV) HARDWARE

TECHNICAL BACKGROUND

Internet Protocol (IP) is popular form of packet communications to exchange data between communication devices. The communication devices exchange IP packets for data services like internet access, media streaming, and file transfers. The communication devices are coupled to various IP access networks that are interconnected to one another over communication interfaces like core IP networks or direct communication links. The IP access networks may be wireless to provide user mobility.

Border Gateway Protocol (BGP) is a popular form of signaling to control the routing of IP packets across IP data networks. IP routers exchange BGP signaling to update their routing information. The IP routers initially process BGP signaling to transition through a series of BGP states to the Established state. In the Established state, the IP routers exchange BGP Update messages and modify their routing tables accordingly. For example, a pair of IP routers may exchange BGP Update messages to open a new set of IP routes and to terminate an old set of IP routes.

Hardware Root-of-Trust (HRoT) systems ensure communication network security and control. The HRoT systems maintain physical separation between trusted hardware and untrusted hardware. The HRoT systems control software access to the trusted hardware but allow interaction between open and secure software components through secure bus interfaces, memories, time slices, and switching circuits. The HRoT systems establish trust with one another by using secret keys embedded in their hardware to generate hash results for remote verification by other trust systems also knowing the secret keys and the hash algorithms.

Communication networks also employ Network Function Virtualization (NFV) to improve service quality. NFV servers process virtual machines that operate as communication network elements such as gateways, controllers, databases, and the like. The NFV servers exchange data packets with other network elements like Ethernet switches and IP routers to support data services like mobile internet access, user messaging, and media transfers. The NFV servers implement hypervisors and context switching to operate in a time-sliced manner. The NFV servers typically separate different virtual networks and/or services in the different NFV time slices.

Unfortunately, the HRoT systems and the NFV systems are not effectively integrated with the BGP systems.

TECHNICAL OVERVIEW

A first Network Function Virtualization (NFV) computer system generates Hardware Root-of-Trust (HRoT) challenge data and transfers the HRoT challenge data in first Border Gateway Protocol (BGP) signaling to a second NFV computer system. The second NFV computer system identifies a physically-embedded HRoT code and generates an HRoT result based on the challenge data and code. The second NFV computer system transfers second BGP signaling having the HRoT result to the first NFV computer system. The first NFV computer system compares the HRoT result from the second BGP signaling to target HRoT data. The first NFV computer system executes a BGP process based on the second BGP signaling if the HRoT result corresponds to the target HRoT data. In some examples, the NFV computer systems also exchange the BGP signaling to verify NFV time slices for BGP Virtual Machines (VMs).

DETAILED DESCRIPTION

Figure 1:
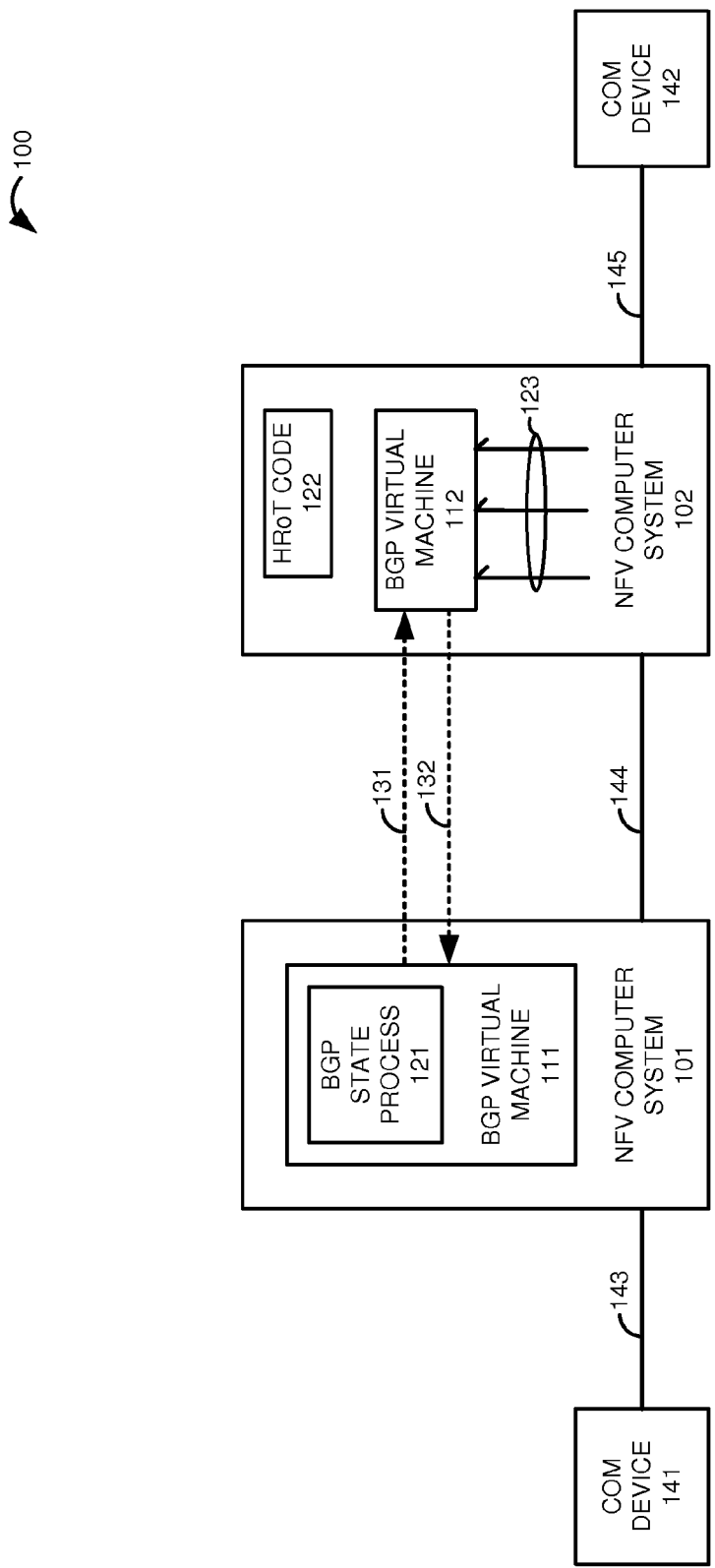
FIGS. 1-3 illustrate a data communication system that exerts Hardware Root-of-Trust (HRoT) control and/or Network Function Virtualization (NFV) control over Border Gateway Protocol (BGP) virtual machines.
Figure 2:
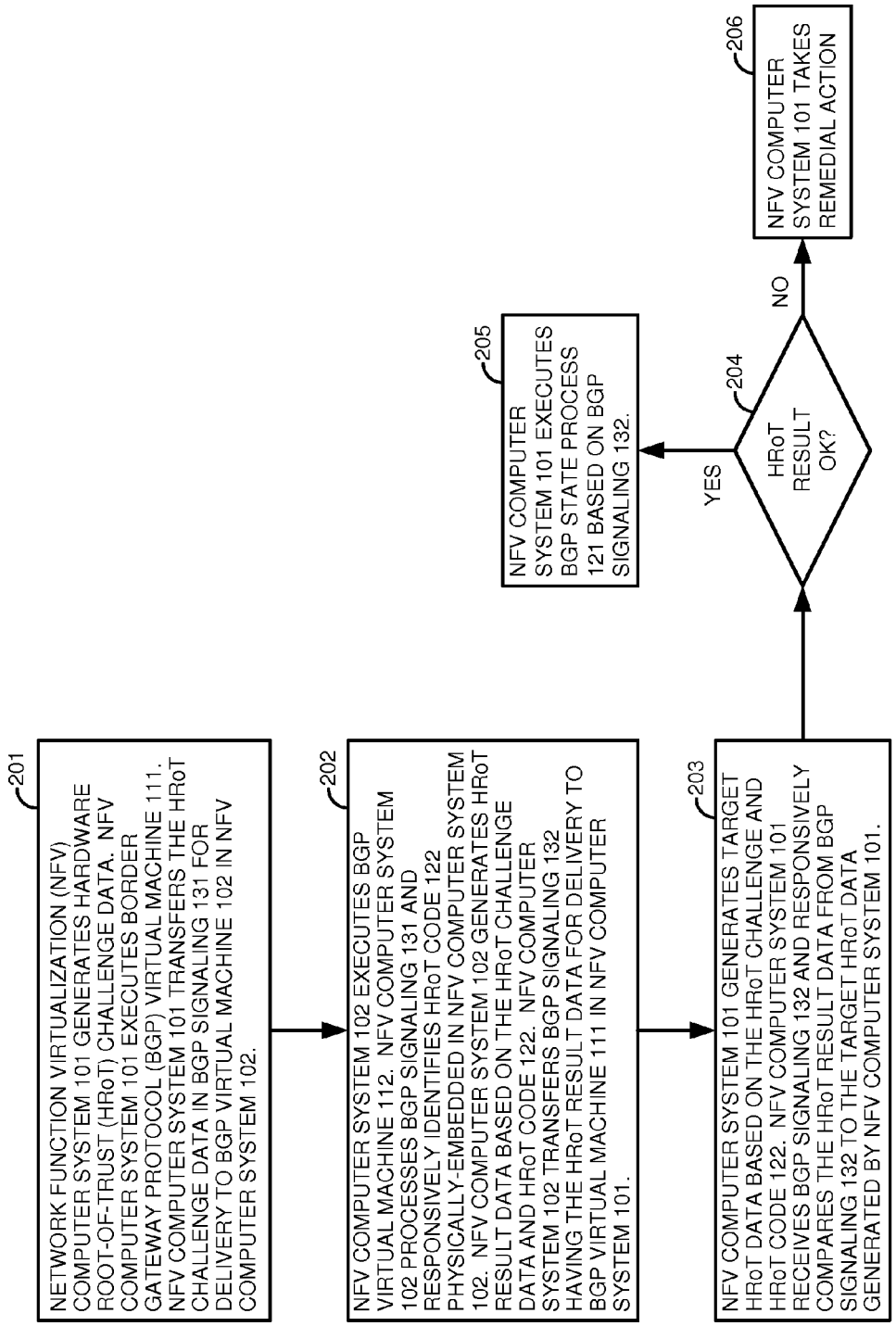
Figure 3:
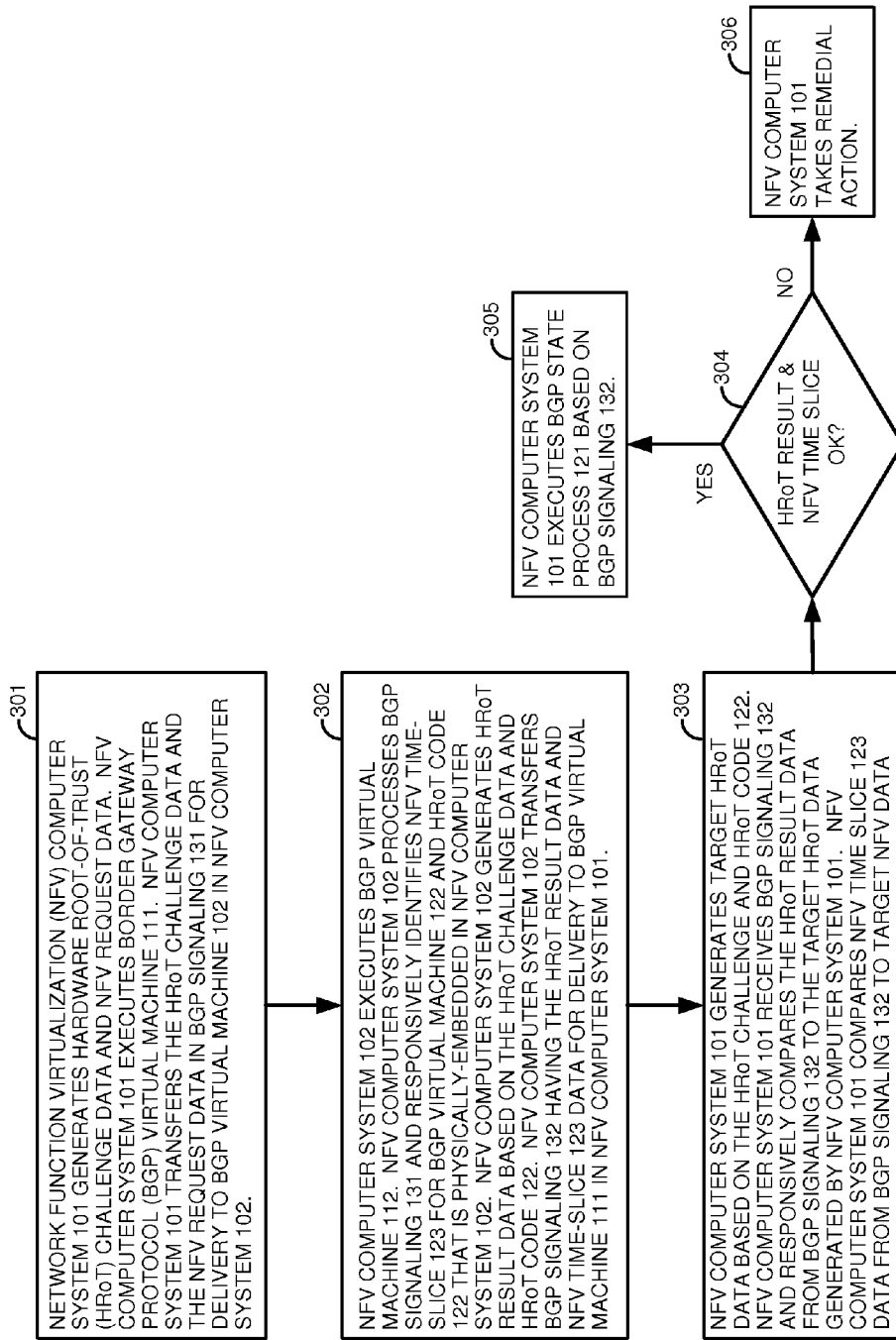

FIGS. 1-3 illustrate data communication system 100 that exerts Hardware Root-of-Trust (HRoT) control and Network Function Virtualization (NFV) control over Border Gateway Protocol (BGP) Virtual Machines (VMs) 111-112. Data communication system 100 comprises NFV computer systems 101-102 that execute respective BGP VMs 111-112. As represented by the arrows, NFV computer system 102 executes BGP VM 112 during NFV time slice 123. NFV computer system 102 also has physically-embedded HRoT code 122. In NFV computer system 101, BGP VM 111 executes BGP state process 121 in addition to other processes. BGP state process 121 comprises a state transition, message transfer, message validation, routing information update, or some other BGP task.

NFV computer system 101 and communication device 141 communicate over communication link 143. NFV computer systems 101-102 communicate over communication link 144. NFV computer system 102 and communication device 142 communicate over communication link 145. NFV computer systems 101-102 exchange BGP signaling 131-132 between BGP VMs 111-112 over communication link 144. Communication links 143-145 might be terrestrial wireless, glass/plastic/metal, satellite, and/or some other communication media. Communication links 143-145 may include intermediate systems, such as additional BGP routers. Communication link 144 is virtual in examples where NFV computer systems 101-102 are the same.

Communication devices 141-142 comprise phones, computers, servers, intelligent machines, and/or some other apparatus having a data transceiver. NFV computer systems 101-102 comprise processing circuitry, memory devices, software, and communication transceivers. NFV computer systems 101-102 route data packets between communication devices 141-142 based on routing information and algorithms in BGP virtual machines 111-112. NFV computer systems 101-102 exchange BGP signaling to distribute and control the routing information and algorithms. A multitude of similar communication devices typically communicate over NFV computer systems 101-102, and NFV computer systems 101-102 typically communicate with many other BGP routers.

NFV computer systems 101-102 exchange BGP signaling 131-132 to establish and report HRoT and NFV data. This HRoT and NFV data is included in one or more BGP messages including TCP, OPEN, NOTIFICATION, KEEP-ALIVE, UPDATE, ROUTE-REFRESH, or some other BGP messaging. The HRoT and NFV data is included in one or more BGP header fields, parameter fields, optional fields, or some other portion of the BGP signaling messages. Note that additional BGP signaling may occur in a supporting and contemporaneous manner to that described herein to perform the BGP processes, but for clarity, the discussion focuses on innovative aspects of the BGP signaling.

Using BGP signaling 131-132, NFV computer system 101 establishes HRoT with NFV computer system 102. For example, NFV computer system 101 may direct BGP VM 111 to transfer a random number challenge to BGP VM 112 in NFV computer system 102. BGP VM 112 requests NFV computer system 102 to return an HRoT result. NFV computer system 102 hashes its embedded HRoT code 122 with the random number to generate the HRoT result for BGP VM 112. BGP VM 112 returns the HRoT result to BGP VM 111 for transfer to NFV computer system 101. NFV computer system 101 compares the received HRoT result to its own self-generated result to verify the hardware trust of NFV computer system 102 and BGP VM 112. In a like manner, NFV computer system 102 and BGP VM 112 may discover and verify the HRoT of other BGP routers and report this HRoT data to NFV computer system 101 in BGP signaling.

Using BGP signaling 131-132, NFV computer system 101 coordinates NFV time-slices with computer system 102. For example, NFV computer system 101 may direct BGP VM 111 to obtain NFV time-slice data from BGP VM 112 in NFV computer system 102. BGP VM 112 requests its time-slice information from NFV computer system 102. NFV computer system 102 identifies NFV time-slice 123 for BGP VM 112. BGP VM 112 indicates NFV time slice 123 to BGP VM 111 for transfer to NFV computer system 101. NFV computer system 101 validates NFV time-slice 123 for BGP VM 112 using its own target NFV data. In a like manner, NFV computer system 102 and BGP VM 112 may discover and verify the NFV time slices of other BGP routers and report this NFV data to NFV computer system 101 in BGP signaling.

In an exemplary operation, NFV computer system 101 executes BGP VM 111 and NFV computer system 102 executes BGP VM 112. NFV computer system 101 generates HRoT challenge data. BGP VM 111 transfers the HRoT challenge data in BGP signaling 131 for delivery to BGP VM 112 in NFV computer system 102. BGP VM 112 processes BGP signaling 131 to request an HRoT result from NFV computer system 102. NFV computer system 102 generates the HRoT result based on the random number and HRoT code 122. BGP VM 112 transfers BGP signaling 132 having the HRoT result for delivery to BGP VM 111 in NFV computer system 101.

NFV computer system 101 generates target HRoT result data based on the HRoT challenge and HRoT code 122. BGP VM 111 receives BGP signaling 132 and transfers HRoT result to NFV computer system 101. NFV computer system 101 compares the HRoT result data from BGP signaling 132 to its self-generated target HRoT data. NFV computer system 101 directs BGP VM 111 to execute BGP state process 121 based on BGP signaling 132 if the HRoT result data from BGP signaling 132 corresponds to the target HRoT data.

For example, BGP VM 111 may send a KEEP-ALIVE message having an HRoT challenge to BGP VM 112 in BGP signaling 131. BGP VM 111 may then receive an UPDATE message having an HRoT result from BGP VM 112 in BGP signaling 132. If the HRoT result is verified by NFV computer system 101, then BGP VM 111 performs the UPDATE state processes, such as updating its routing data. If the HRoT result for BGP VM 112 does not correspond to the target HRoT data, then BGP VM 111 performs the BGP state process by transitioning from an ESTABLISHED state to an IDLE state.

In some examples, NFV computer system 101 generates NFV request data for BGP VM 112. BGP VM 111 transfers the NFV request data in BGP signaling 131 for delivery to BGP VM 112 in NFV computer system 102. BGP VM 112 processes BGP signaling 131 to request NFV time-slice data from NFV computer system 102. NFV computer system 102 identifies NFV time slice 123 for BGP VM 112. BGP VM 112 transfers BGP signaling 132 indicating NFV time slice 123 for BGP VM 112 for delivery to BGP VM 111 in NFV computer system 101. BGP VM 111 receives BGP signaling 132 and identifies NFV time slice 123 for BGP VM 112 to NFV computer system 101. NFV computer system 101 verifies NFV time slice 123 for BGP VM 112 against its own target NFV data. NFV computer system 101 then directs BGP VM 111 to execute a BGP state process based on BGP signaling 132 if the NFV time slice 123 for BGP VM 112 corresponds to the target NFV data.

For example, BGP VM 111 may send a KEEP-ALIVE message having an NFV request to BGP VM 112 in BGP signaling 131. BGP VM 111 may then receive an UPDATE message indicating NFV time-slice 123 from BGP VM 112 in BGP signaling 132. If NFV time-slice 123 is verified by NFV computer system 101, then BGP VM 111 performs the UPDATE state processes, such as updating its routing data. If NFV time slice 123 for BGP VM 112 does not correspond to the target NFV data, then BGP VM 111 performs the BGP state process by transitioning from an ESTABLISHED state to an IDLE state.

In some examples, BGP VM 111 sends Transaction Control Protocol (TCP) messaging having an HRoT challenge and NFV request to BGP VM 112 in BGP signaling 131. BGP VM 111 may then receive TCP messaging indicating the HRoT result based on code 122 and NFV time-slice 123 from BGP VM 112 in BGP signaling 132. If the HRoT result and the NFV time-slice 123 are verified by NFV computer system 101, then BGP VM 111 performs the IDLE state processes by transitioning from an IDLE state to a CONNECT state.

In some examples, BGP VM 111 sends OPEN messaging having an HRoT challenge and NFV request to BGP VM 112 in BGP signaling 131. BGP VM 111 may then receive OPEN messaging indicating the HRoT result based on code 122 and NFV time-slice 123 from BGP VM 112 in BGP signaling 132. If the HRoT result and NFV time-slice 123 are verified by NFV computer system 101, then BGP VM 111 performs the OPEN SENT state process by transitioning from an OPEN SENT state to an OPEN CONFIRM state.

In some examples, BGP VM 111 sends KEEP-ALIVE messaging having an HRoT challenge and NFV request to BGP VM 112 in BGP signaling 131. BGP VM 111 may then receive KEEP-ALIVE messaging indicating the HRoT result based on code 122 and NFV time-slice 123 from BGP VM 112 in BGP signaling 132. If the HRoT result and NFV time-slice 123 are verified by NFV computer system 101, then BGP VM 111 performs the OPEN CONFIRM state process by transitioning from an OPEN CONFIRM state to an ESTABLISHED state.

If the HRoT result or the NFV time-slice are improper, then BGP VM 111 may take remedial measures such as transferring NOTIFICATION messages to BGP VM 112 to remedy the HRoT or NFV issue. BGP VM 111 may also transfer NOTIFICATION messages to other BGP routers as a status warning for BGP VM 112 and NFV computer system 102.

Referring to FIG. 2, an exemplary operation of communication system 100 is described. NFV computer system 101 generates HRoT challenge data (201). NFV computer system 101 executes BGP VM 111(201). BGP VM 111 transfers the HRoT challenge data in BGP signaling 131 from NFV computer system 101 for delivery to BGP VM 112 in NFV computer system 102 (201).

NFV computer system 102 executes BGP VM 112 (202). BGP VM 112 processes BGP signaling 131 to request an HRoT result from NFV computer system 102 (202). NFV computer system 102 generates the HRoT result based on the random number in the challenge data and physically-embedded HRoT code 122 (202). BGP VM 112 transfers BGP signaling 132 having the HRoT result from NFV computer system 112 for delivery to BGP VM 111 in NFV computer system 101 (202).

NFV computer system 101 generates target HRoT data based on the HRoT challenge and HRoT code 122 (203). BGP VM 111 receives BGP signaling 132 and transfers HRoT result to NFV computer system 101 (203). NFV computer system 101 compares the HRoT result data from BGP signaling 132 to its self-generated target HRoT data (203).

If the HRoT result data from BGP signaling 132 corresponds to the target HRoT data (204), then NFV computer system 101 directs BGP VM 111 to execute a BGP state process based on BGP signaling 132 (205), such as such as updating routing information. If the HRoT result data from BGP signaling 132 does not correspond to the target HRoT data (204), then NFV computer system 101 directs BGP VM 111 to take remedial action (206), such as reverting to the IDLE state and sending corresponding NOTIFICATION messages to associated BGP routers.

Referring to FIG. 3, another exemplary operation of communication system 100 is described. NFV computer system 101 generates HRoT challenge data and NFV request data (301). NFV computer system 101 executes BGP VM 111 (301). BGP VM 111 transfers the HRoT challenge data and the NFV request data in BGP signaling 131 from NFV computer system 101 for delivery to BGP VM 112 in NFV computer system 102 (301).

NFV computer system 102 executes BGP VM 112 (302). BGP VM 112 processes BGP signaling 131 to request NFV time-slice information and an HRoT result from NFV computer system 102 (302). NFV computer system 102 identifies NFV time slice 123 for BGP VM 112—typically from a hypervisor database. NFV computer system 102 generates the HRoT result based on the random number in the challenge data and physically-embedded HRoT code 122 (302). BGP VM 112 transfers BGP signaling 132 having the HRoT result and NFV time-slice 123 information from NFV computer system 112 for delivery to BGP VM 111 in NFV computer system 101 (302).

NFV computer system 101 generates target HRoT data based on the HRoT challenge and HRoT code 122 (303). BGP VM 111 receives BGP signaling 132 and transfers HRoT result to NFV computer system 101 (303). NFV computer system 101 compares the HRoT result data from BGP signaling 132 to its self-generated target HRoT data (303). NFV computer system 101 also compares NFV time-slice 123 from BGP signaling 132 to its own target NFV data (303).

If the HRoT result data from BGP signaling 132 corresponds to the target HRoT data and if the NFV time-slice 123 corresponds to the target NFV data (304), then NFV computer system 101 directs BGP VM 111 to execute a BGP state process based on BGP signaling 132 (305). For example, BGP VM 111 might send an OPEN message and transition to the OPEN SENT state. If the HRoT result data from BGP signaling 132 does not correspond to the target HRoT data or if NFV time-slice 123 does not correspond to the target NFV data (304), then NFV computer system 101 directs BGP VM 111 to take remedial action (306). For example, BGP VM 111 might revert to the ACTIVE state and retry the HRoT and NFV validation process.

Figure 4:
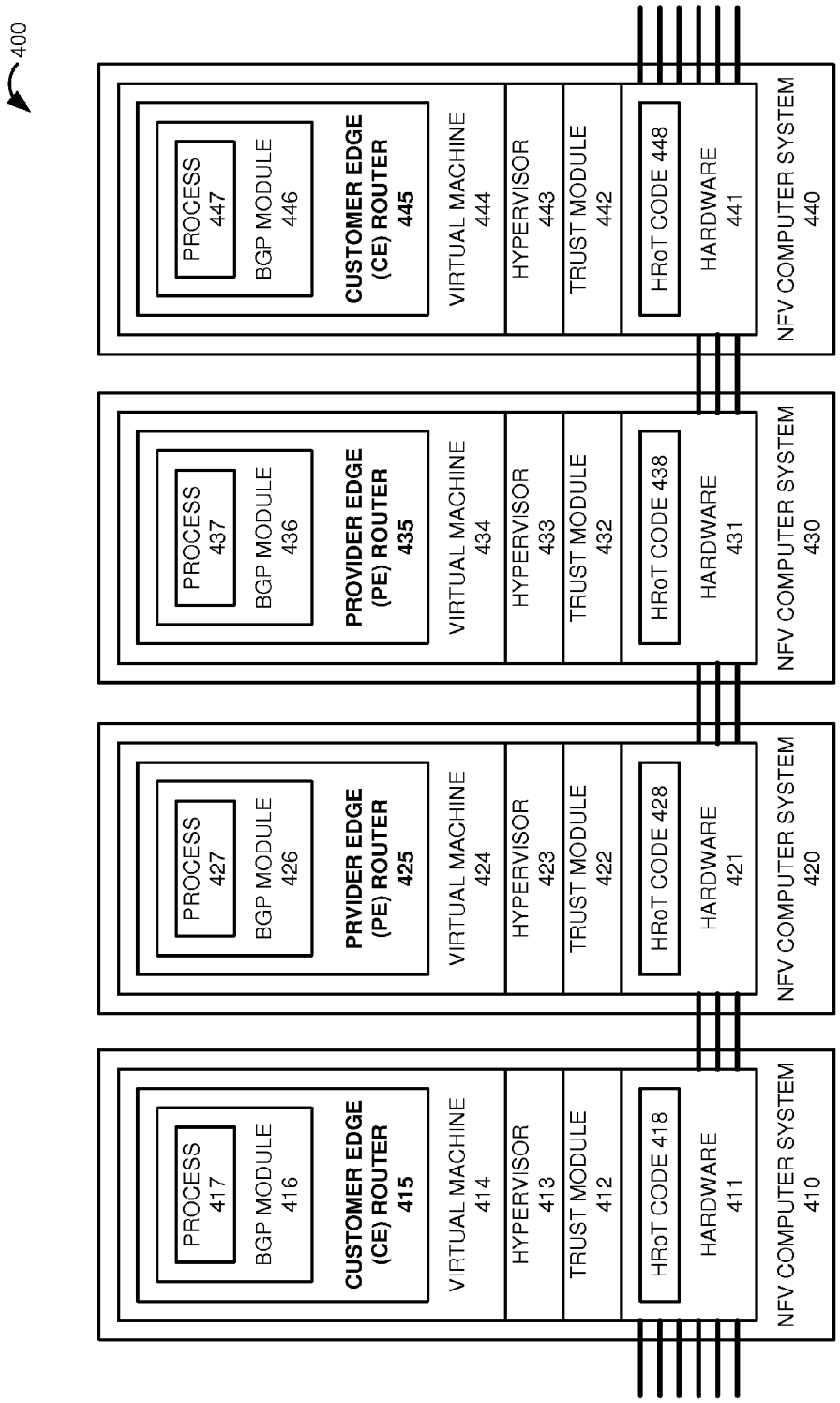
FIGS. 4-6 illustrate a data communication system comprising Customer Edge (CE) Border Gateway Protocol (BGP) routers and Provider Edge (PE) BGP routers with integrated Hardware Root-of-Trust (HRoT) and Network Function Virtualization (NFV) control.
Figure 5:
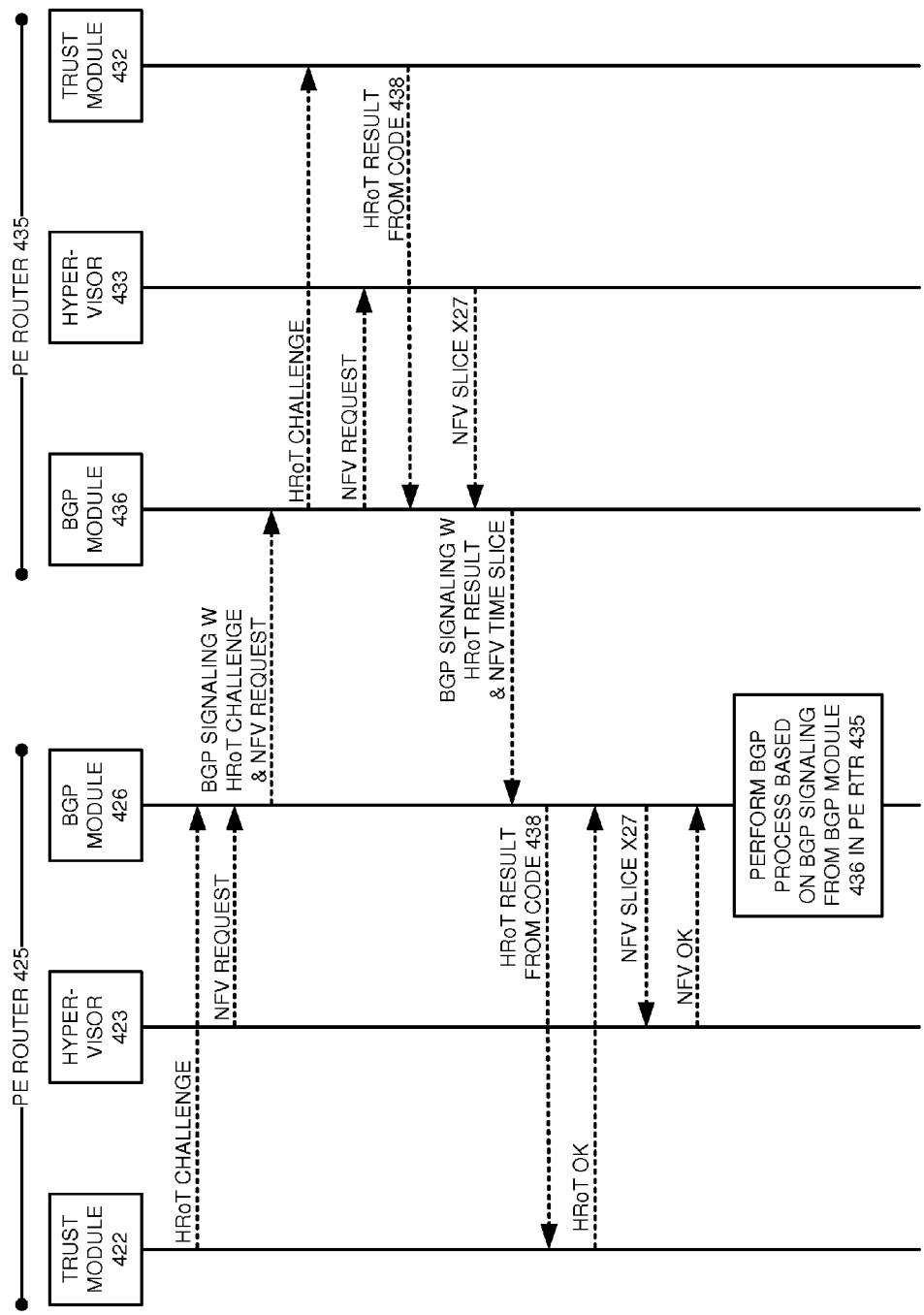
Figure 6:
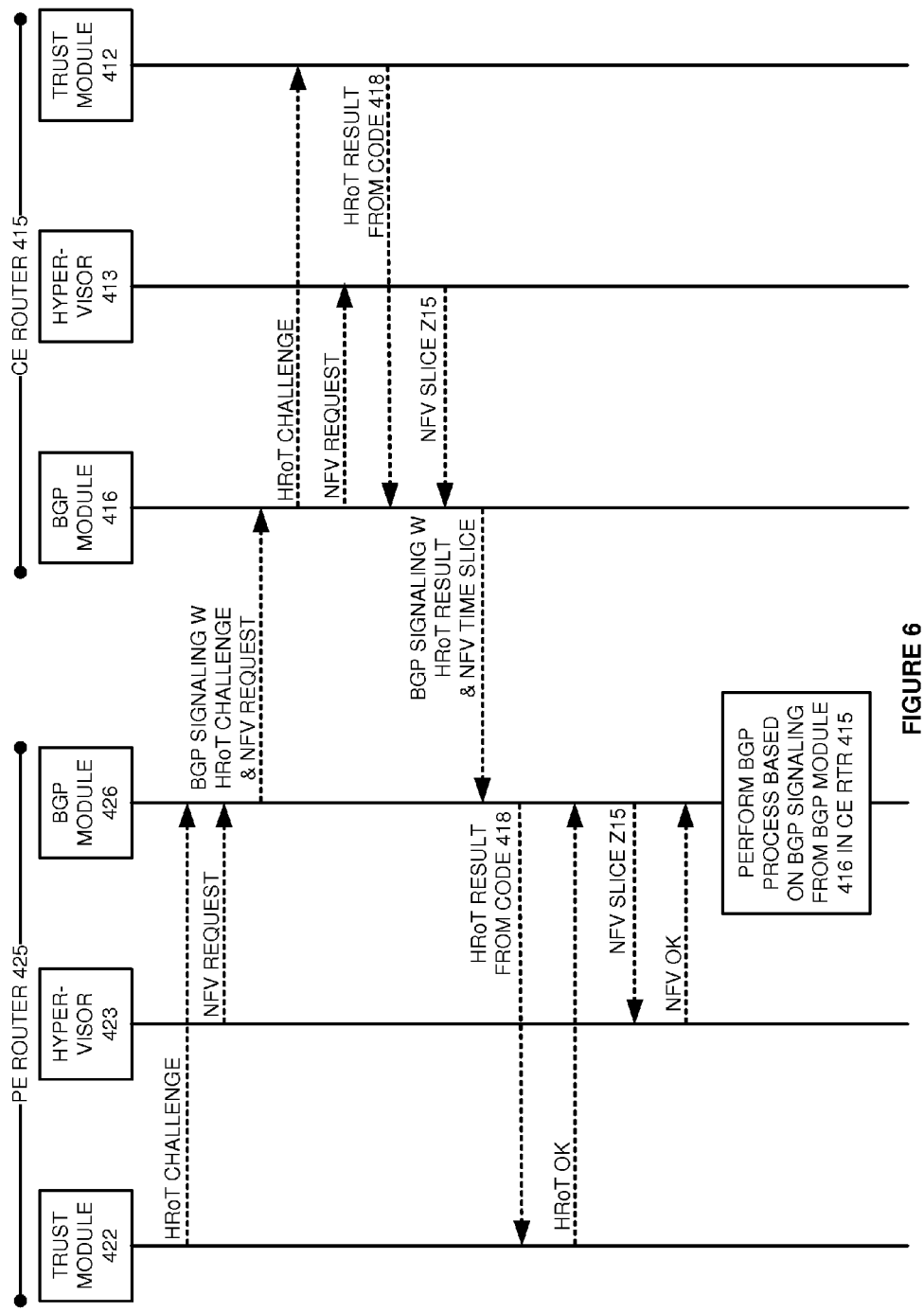

FIGS. 4-6 illustrate data communication system 400 that includes Customer Edge (CE) Border Gateway Protocol (BGP) routers 415 and 445 and Provider Edge (PE) BGP routers 425 and 435 with integrated Hardware Root-of-Trust (HRoT) and Network Function Virtualization (NFV) control. Data communication system 400 comprises NFV computer systems 410, 420, 430, and 440 that are coupled to one another and to various other communication devices.

NFV computer system 410 includes hardware 411 that has physically embedded HRoT code 418. Hardware 411 comprises processing circuitry, memory devices, and I/O interfaces. Access to hardware 411 is controlled by trust software module 412. Trust software module 411 allows hypervisor 413 to execute on hardware 411 to configure system 410 with an NFV operational environment. Hypervisor 413 executes VM 414 during a specific NFV time slice. VM 414 comprises CE router 415. CE router 415 has BGP module 416 that includes software for state process 417.

Likewise, NFV computer system 420 includes hardware 421 that has physically embedded HRoT code 428. Trust software module 421 allows hypervisor 423 to execute on hardware 421. Hypervisor 423 executes VM 424 during a specific NFV time slice. VM 424 comprises PE router 425 that has BGP module 426 with state process 427. NFV computer system 430 includes hardware 431 that has physically embedded HRoT code 438. Trust software module 431 allows hypervisor 433 to execute on hardware 431. Hypervisor 433 executes VM 434 during a specific NFV time slice. VM 434 comprises PE router 435 that has BGP module 436 with state process 437. NFV computer system 440 includes hardware 441 that has physically embedded HRoT code 448. Trust software module 441 allows hypervisor 443 to execute on hardware 441. Hypervisor 443 executes VM 444 during a specific NFV time slice. VM 444 comprises CE router 445 that has BGP module 446 with state process 447.

For clarity, some network elements are not shown on FIG. 4. There are many more CE routers that are connected to various user computers and intelligent machines. There are additional PE routers and NFV computer systems. There are also a multitude of additional VMs, and some VMs move from one NFV computer system to another. VMs may also move from one NFV time slice to another.

Referring to FIG. 5, BGP signaling between PE routers 425 and 435 is described. In PE router 425, trust module 422 transfers an HRoT challenge to BGP module 426, and Hypervisor 423 transfers an NFV request to BGP module 426. BGP module 426 transfers the HRoT challenge and NFV request in BGP signaling from PE router 425 to BGP module 436 in PE router 435. Responsive to the BGP signaling, BGP module 436 transfers the HRoT challenge to trust module 432 and transfers the NFV request to hypervisor 433. Trust module 432 reads and hashes HRoT code 438 with the HRoT challenge data to generate an HRoT result. Trust module 432 returns the HRoT result to BGP module 436. Hypervisor 433 identifies NFV time slice "X27" for BGP module 436 and returns an NFV time slice X27 ID to BGP module 436.

BGP module 436 transfers BGP signaling from PE router 435 that indicates NFV time slice "X27" and the HRoT result for BGP module 436 to BGP module 426 in PE router 425. BGP module 426 transfers the HRoT result from code 438 to trust module 422. BGP module 426 transfers time slice X27 ID to hypervisor 423. Trust module 422 verifies the HRoT result from PE router 435 with its own target data. In this case, the HRoT result properly aligns with the target data, so trust module 422 returns an HRoT OK indication to BGP module 426. Likewise, hypervisor 423 verifies NFV time slice "X27" for BGP module 436 against its own target data and returns an NFV OK indication to BGP module 426.

In response to the HRoT and NFV OK indications, BGP module 426 in PE router 425 executes BGP processes based on BGP signaling from BGP module 436 in PE router 435. This process execution continues for a time-period and/or a particular state transition. Numerous additional PE routers and BGP modules could operate in a similar manner to establish a trusted NFV-based PE core network.

Referring to FIG. 6, BGP signaling between PE router 425 and CE router 415 is described. In PE router 425, trust module 422 transfers an HRoT challenge to BGP module 426, and Hypervisor 423 transfers an NFV request to BGP module 426. BGP module 426 transfers the HRoT challenge and NFV request in BGP signaling from PE router 425 to BGP module 416 in CE router 415. Responsive to the BGP signaling, BGP module 416 transfers the HRoT challenge to trust module 412 and transfers the NFV request to hypervisor 413. Trust module 412 reads and hashes HRoT code 418 with the HRoT challenge data to generate an HRoT result. Trust module 412 returns the HRoT result to BGP module 416. Hypervisor 413 identifies NFV time slice "Z15" for BGP module 416 and returns an ID for NFV time slice "Z15" to BGP module 416.

BGP module 416 transfers BGP signaling from CE router 415 that indicates NFV time slice "Z15" and the HRoT result for BGP module 416 to BGP module 426 in PE router 425. BGP module 426 transfers the HRoT result from code 418 to trust module 422. BGP module 426 transfers time slice Z15 ID to hypervisor 423. Trust module 422 verifies the HRoT result from CE router 415 with its own target data. In this case, the HRoT result properly aligns with the target data, so trust module 422 returns an HRoT OK indication to BGP module 426. Likewise, hypervisor 423 verifies NFV time slice "Z15" for BGP module 416 against its own target data and returns an NFV OK indication to BGP module 426.

In response to the HRoT and NFV OK indications, BGP module 426 in PE router 425 executes BGP processes based on BGP signaling from BGP module 416 in CE router 415. This process execution continues for a time-period and/or a particular state transition. Numerous additional PE/CE routers and BGP modules could operate in a similar manner to establish a trusted NFV-based PE/CE access network.

Figure 7:
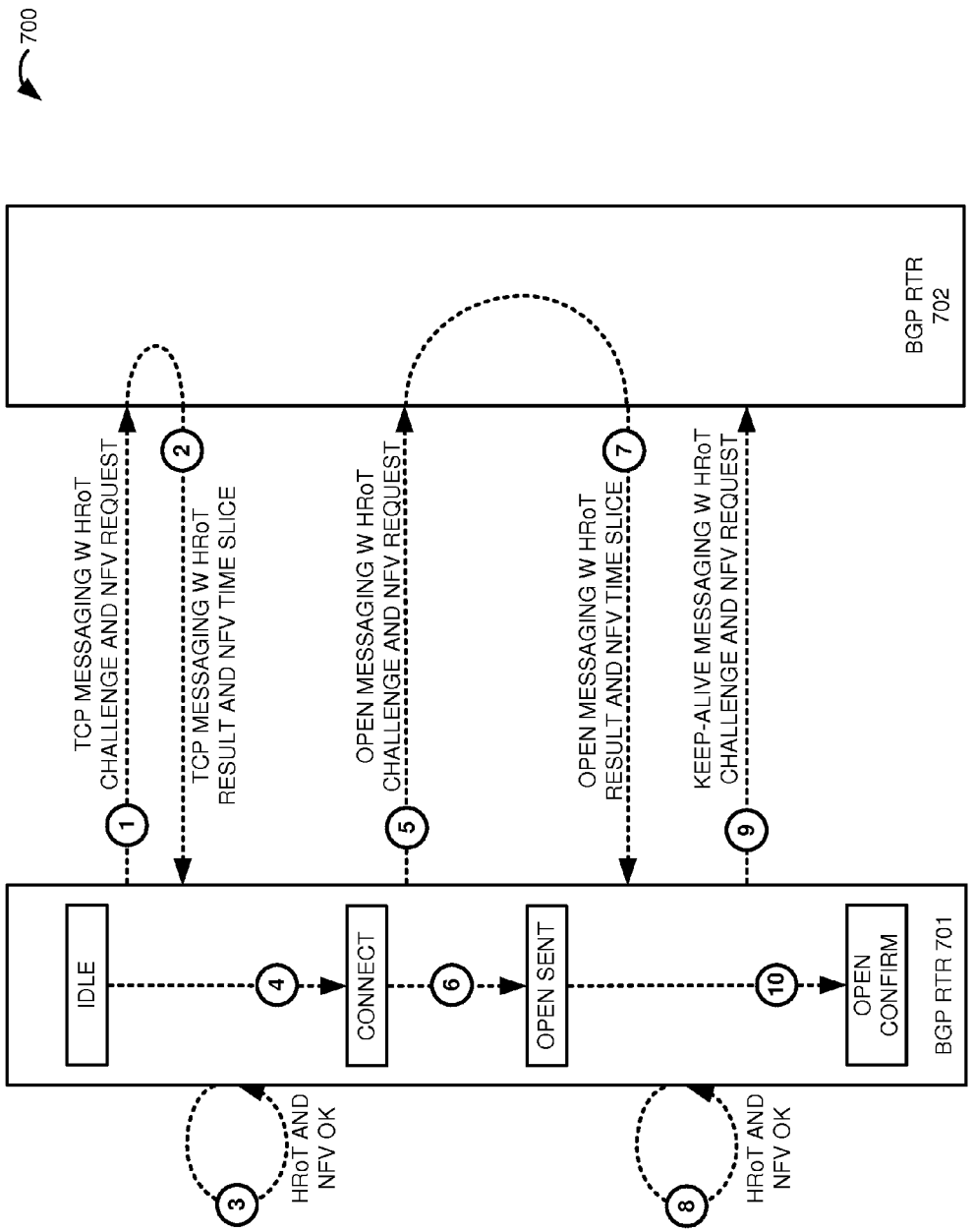
FIGS. 7-8 illustrate a data communication system comprising Border Gateway Protocol (BGP) routers with Hardware Root-of-Trust (HRoT) and Network Function Virtualization (NFV) control over BGP state transitions and route updates.
Figure 8:
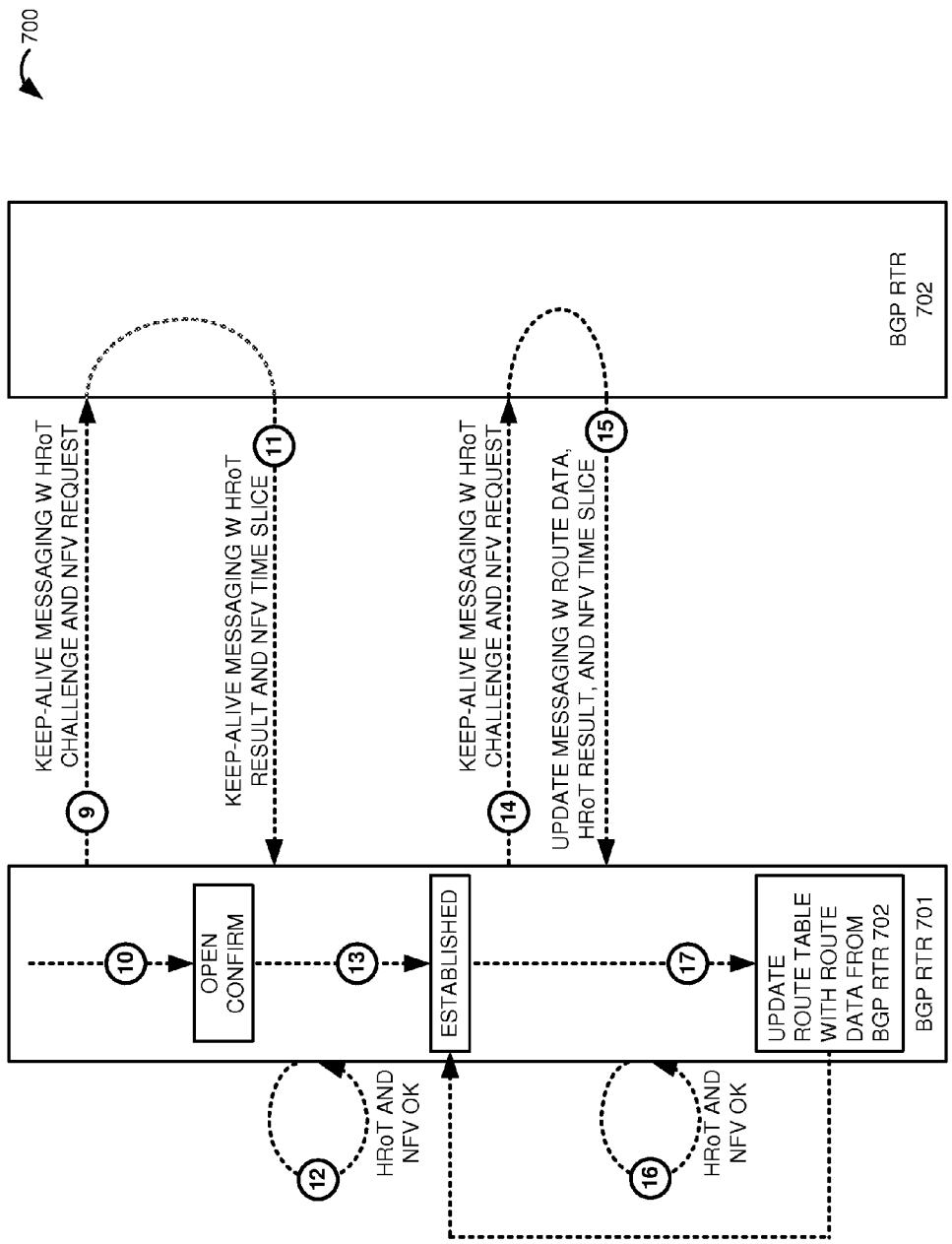

FIGS. 7-8 illustrate data communication system 700 comprising Border Gateway Protocol (BGP) routers 701-701 with Hardware Root-of-Trust (HRoT) and Network Function Virtualization (NFV) control over BGP state transitions and route updates. BGP router 701 is initially in IDLE state. In a first operation, BGP router 701 transfers TCP messaging to BGP router 702 having an HRoT challenge and an NFV request. In a second operation and responsive to the TCP messaging, BGP router 702 generates an HRoT result for the HRoT challenge and identifies an NFV time slice for the NFV request. BGP router 702 then transfers TCP messaging to BGP router 701 having the HRoT result and NFV time slice ID. In a third operation, BGP router 701 verifies this HRoT result and this NFV time slice for BGP router 702. In a fourth operation and in response to the verification, BGP router 701 continues to establish the TCP connection with BGP router 702 and transitions from the IDLE state to the CONNECT state. Without the HRoT/NFV verification, BGP router 701 transitions to the ACTIVE state for retry or IDLE.

In a fifth operation, BGP router 701 transfers OPEN messaging to BGP router 702 having an HRoT challenge and an NFV request. In a sixth operation, BGP router 701 transitions from the CONNECT state to the OPEN SENT state. In a seventh operation and responsive to the OPEN messaging, BGP router 702 generates an HRoT result for the HRoT challenge and identifies an NFV time slice for the NFV request. BGP router 702 then transfers OPEN messaging to BGP router 701 having the HRoT result and NFV time slice ID. In an eighth operation, BGP router 701 verifies the HRoT result and the NFV time slice for BGP router 702. In a ninth operation and responsive to this verification, BGP router 701 transfers a KEEP-ALIVE message having an HRoT challenge and an NFV request. In a tenth operation, BGP router 701 transitions from the OPEN SENT state to the OPEN CONFIRM state.

Referring to FIG. 8, the ninth and tenth operations (the KEEP-ALIVE message and the OPEN CONFIRM state) are shown again for reference. In an eleventh operation and responsive to the KEEP-ALIVE messaging, BGP router 702 generates an HRoT result for the HRoT challenge and identifies an NFV time slice for the NFV request. BGP router 702 then transfers KEEP-ALIVE messaging to BGP router 701 having the corresponding HRoT result and NFV time slice ID. In a twelfth operation, BGP router 701 verifies this HRoT result and the NFV time slice for BGP router 702. In a thirteenth operation and responsive to the verification, BGP router 701 transitions from the OPEN CONFIRM state to the ESTABLISHED state. Without this verification, BGP router 701 transitions to the ACTIVE state for retry or IDLE.

In a fourteenth operation and responsive to the ESTABLISHED state, BGP router 701 transfers a KEEP-ALIVE message having an HRoT challenge and an NFV request. In a fifteenth operation and responsive to the KEEP-ALIVE messaging, BGP router 702 generates an HRoT result for the HRoT challenge and identifies an NFV time slice for the NFV request. BGP router 702 then transfers UPDATE messaging with new routing data to BGP router 701. The UPDATE messaging also has the corresponding HRoT result and NFV time slice ID. In a sixteenth operation, BGP router 701 verifies this HRoT result and the NFV time slice for BGP router 702. In a seventeenth operation and responsive to this verification, BGP router 701 updates its routing table based on the new routing data from router 702. Without this verification, BGP router 701 transitions to IDLE. Additional updates may occur in this manner.

The routing table updates might be to the Network Layer Reachability Information (NLRI) in the main routing table in BGP router 701. The routing table updates might be to the Adjacent Routing Info Databases for neighbor BGP router 702. The routing table updates may carry routes, prefixes, parameters, weights, policies, and the like. Note that HRoT and NFV checks could be performed less often. For example, verifications processes associated with operations 8 and 12 could be omitted in some examples.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data communication system using Border Gateway Protocol (BGP), Network Function Virtualization (NFV), and Hardware Root-of-Trust (HRoT) comprising:

in a first NFV computer system, generating HRoT challenge data, executing a first BGP virtual machine, and transferring the HRoT challenge data in first BGP signaling for delivery to a second BGP virtual machine in a second NFV computer system;

in the second NFV computer system, executing the second BGP virtual machine, processing the first BGP signaling, and responsively identifying an HRoT code physically-embedded in the second NFV computer system, generating HRoT result data based on the HRoT challenge data and the HRoT code, and transferring second BGP signaling having the HRoT result data for delivery to the first BGP virtual machine in the first NFV computer system;

in the first NFV computer system, generating target HRoT result data based on the HRoT challenge and the HRoT code, receiving the second BGP signaling, and responsively comparing the HRoT result data from the second BGP signaling to the target HRoT data generated by the first NFV computer system; and in the first NFV computer system, executing a BGP state process based on the second BGP signaling if the HRoT result data from the second BGP signaling corresponds to the target HRoT data generated by the first NFV computer system.

2. The method of claim 1 wherein the first BGP signaling comprises KEEP-ALIVE messaging and the second BGP signaling comprise UPDATE messaging and performing the BGP state process comprises updating routing data in the first BGP virtual machine based on the UPDATE messaging if the HRoT result data from the UPDATE messaging corresponds to the target HRoT data.

3. The method of claim 1 further comprising:
in the first NFV computer system, generating and transferring NFV request data in the first BGP signaling;
in the second NFV computer system, processing the NFV request data and responsively generating NFV time-slice data for the second BGP virtual machine and transferring the NFV time-slice data in the second BGP signaling;
in the first NFV computer system, comparing the NFV time-slice data for the second BGP virtual machine to target NFV data; and
wherein executing the BGP state process in the first NFV computer system if the HRoT result data corresponds to the target HRoT data comprises executing the BGP state process only if the HRoT result data corresponds to the target HRoT data and if the NFV time-slice data corresponds to the target NFV data.

4. The method of claim 3 wherein the first BGP signaling comprises KEEP-ALIVE messaging and the second BGP signaling comprise UPDATE messaging and performing the BGP state process if the HRoT result data corresponds to the target HRoT data comprises updating routing data in the first BGP virtual machine based on the UPDATE messaging if the HRoT result data from the UPDATE messaging corresponds to the target HRoT data and if the NFV time-slice data from the UPDATE messaging corresponds to the target NFV data.

5. The method of claim 3 wherein the first BGP signaling comprises UPDATE messaging and performing the BGP state process comprises transitioning the first BGP virtual machine from an ESTABLISHED state to an IDLE state if the HRoT result data from the UPDATE messaging does not correspond to the target HRoT data or if the NFV time-slice data from the UPDATE messaging does not correspond to the target NFV data.

6. The method of claim 1 wherein the first BGP signaling and the second BGP signaling comprise Transaction Control Protocol (TCP) messaging and performing the BGP state process comprises transitioning the first BGP virtual machine from an IDLE state to a CONNECT state.

7. The method of claim 1 wherein the first BGP signaling and the second BGP signaling comprise OPEN messaging and performing the BGP state process comprises transitioning the first BGP virtual machine from an OPEN SENT state to an OPEN CONFIRM state.

8. The method of claim 1 wherein the first BGP signaling and the second BGP signaling comprise KEEP-ALIVE messaging and performing the BGP state process comprises transitioning the first BGP virtual machine from an OPEN CONFIRM state to an ESTABLISHED state.

9. The method of claim 1 wherein the first BGP virtual machine comprises a Provider Edge (PE) router and the second BGP virtual machine comprises a Customer Edge (CE) router.

10. The method of claim 1 wherein the first BGP virtual machine comprises a first Provider Edge (PE) router and the second BGP virtual machine comprises a second PE router.

11. A data communication system that uses Border Gateway Protocol (BGP), Network Function Virtualization (NFV), and Hardware Root-of-Trust (HRoT) comprising:
a first NFV computer system configured to generate HRoT challenge data, execute a first BGP virtual machine, and transfer the HRoT challenge data in first BGP signaling for delivery to a second BGP virtual machine in a second NFV computer system;
the second NFV computer system configured to execute the second BGP virtual machine, process the first BGP signaling, and responsively identify an HRoT code physically-embedded in the second NFV computer system, generate HRoT result data based on the HRoT challenge data and the HRoT code, and transfer second BGP signaling having the HRoT result data for delivery to the first BGP virtual machine in the first NFV computer system;
the first NFV computer system configured to generate target HRoT result data based on the HRoT challenge and the HRoT code, receive the second BGP signaling, and responsively compare the HRoT result data from the second BGP signaling to the target HRoT data generated by the first NFV computer system; and
the first NFV computer system configured to execute a BGP state process based on the second BGP signaling if the HRoT result data from the second BGP signaling corresponds to the target HRoT data generated by the first NFV computer system.

12. The data communication system of claim 11 wherein the first BGP signaling comprises KEEP-ALIVE messaging and the second BGP signaling comprise UPDATE messaging and the first NFV computer system is configured to update routing data in the first BGP virtual machine based on the UPDATE messaging if the HRoT result data from the UPDATE messaging corresponds to the target HRoT data.

13. The data communication system of claim 11 wherein:
the first NFV computer system is configured to generate and transfer NFV request data in the first BGP signaling;
in the second NFV computer system is configured to process the NFV request data and responsively generate NFV time-slice data for the second BGP virtual machine and transfer the NFV time-slice data in the second BGP signaling;
the first NFV computer system is configured to compare the NFV time-slice data for the second BGP virtual machine to target NFV data and execute the BGP state process only if the HRoT result data corresponds to the target HRoT data and if the NFV time-slice data corresponds to the target NFV data.

14. The data communication system of claim 13 wherein the first BGP signaling comprises KEEP-ALIVE messaging and the second BGP signaling comprise UPDATE messaging and the first NFV computer system is configured to update routing data in the first BGP virtual machine based on the UPDATE messaging if the HRoT result data from the UPDATE messaging corresponds to the target HRoT data and if the NFV time-slice data from the UPDATE messaging corresponds to the target NFV data.

15. The data communication system of claim 13 wherein the first BGP signaling comprises UPDATE messaging and the first NFV computer system is configured to transition the first BGP virtual machine from an ESTABLISHED state to an IDLE state if the HRoT result data from the UPDATE messaging does not correspond to the target HRoT data or if the NFV time-slice data from the UPDATE messaging does not correspond to the target NFV data.

16. The data communication system of claim 11 wherein the first BGP signaling and the second BGP signaling comprise Transaction Control Protocol (TCP) messaging and the first NFV computer system is configured to transition the first BGP virtual machine from an IDLE state to a CONNECT state.

17. The data communication system of claim 11 wherein the first BGP signaling and the second BGP signaling comprise OPEN messaging and the first NFV computer system is configured to transition the first BGP virtual machine from an OPEN SENT state to an OPEN CONFIRM state.

18. The data communication system of claim 11 wherein the first BGP signaling and the second BGP signaling comprise KEEP-ALIVE messaging and the first NFV computer system is configured to transition the first BGP virtual machine from an OPEN CONFIRM state to an ESTABLISHED state.

19. The data communication system of claim 11 wherein the first BGP virtual machine comprises a Provider Edge (PE) router and the second BGP virtual machine comprises a Customer Edge (CE) router.

20. The data communication system of claim 11 wherein the first BGP virtual machine comprises a first Provider Edge (PE) router and the second BGP virtual machine comprises a second PE router.

\* \* \* \* \*